3,012,037
ESTERS OF 3-METHYL-4-PHENYL-4-
CARBOXYPIPERIDINE
Paul A. J. Janssen, Antwerpse Steenweg 16', Vosselaar,
near Turnhout, Belgium
No Drawing. Filed Apr. 29, 1960, Ser. No. 25,597
6 Claims. (Cl. 260—294.3)

The present invention relates to a novel group of 3-methylpiperidine derivatives and more particularly to the lower alkyl esters of 3-methyl-4-phenyl-4-carboxypiperidine of the general structural formula

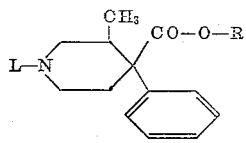

wherein L is a member of the class consisting of lower alkyl radicals and —$CH_2$—$CH_2$—O—$CH_2$—$CH_2$—OH radical; and R is a lower alkyl radical.

The lower alkyl radicals in the foregoing formula can be methyl, ethyl, and straight-chain or branched propyl, butyl, hexyl, and heptyl radicals.

The 3-methylpiperidine compounds described herein have a much greater analgesic activity than the analogs without the 3-methyl substituent. They are also active as hypnotics and barbiturate potentiators while having low activity as mydriatic agents.

The organic bases of this invention form non-toxic, acid-addition salts with a variety of organic and inorganic acids. Such salts are formed with such acids as sulfuric, phosphoric, hydrochloric, hydrobromic, hydriodic, sulfamic, citric, lactic, maleic, malic, succinic, tartaric, cinnamic, acetic, benzoic, gluconic, ascorbic and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfate, methyl benzenesulfonate, ethyl toluenesulfonate, ethylene chlorohydrin, propylene chlorohydrin, allyl bromide, methallyl bromide and crotyl bromide.

These compounds can be prepared by the condensation of an appropriately selected compound of the formula L—Halogen wherein L is described as above, with an appropriately selected ester of 3-methyl-4-phenyl-4-carboxypiperidine. The reaction is carried out and in a suitable solvent, e.g. a lower alkanol (methanol, ethanol, propanol, butanol). In this reaction elevated temperatures can be used advantageously to accelerate the reaction.

Where L is a methyl group, this group can be introduced by treatment of the N-unsubstituted derivatives with formaldehyde and formic acid.

The 3-methyl-4-phenyl-4-carboxypiperidine esters described as intermediates in the preparation of these compounds are prepared in the following manner. β-Hydroxypropyl-β-hydroxyethylamine is heated with 4-toluenesulfonyl chloride to give N-(β-hydroxypropyl)-N-(β-hydroxyethyl) - N - (4 - toluenesulfonyl)amine. This compound is then heated with thionyl chloride to form the corresponding N-(β-chloropropyl)-N-(β-chloroethyl) derivative. A ring closure is accomplished by heating this compound with phenylacetonitrile in the presence of sodimide to form a compound of the formula

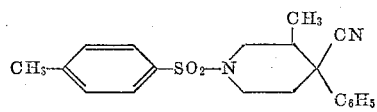

In this reaction there are two stereoisomers formed. These isomers are separated by fractional crystallization, typically from acetone. The isomer first obtained is designated in the following examples at the α-isomer; the second isomer obtained is called β. It is believed that the α-isomer has the structure in which the methyl group is trans to the phenyl, while the β-isomer has the reverse configuration. The β-isomers of the compounds claimed consistently have by far the greater pharmacological potency.

The 4-cyano group of the compound prepared above is then hydrolyzed to form a 4-carboxypiperidine derivative. This compound can then be esterified by heating it with thionyl chloride and then with the appropriate lower alkanol. The compound thus formed has the formula

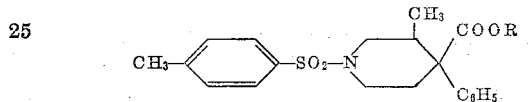

Heating of this compound with phenol and a 30% solution of hydrogen bromide in acetic acid gives 3-methyl-4-phenylpiperidine-4-carboxylate.

The compounds which constitute this invention and their preparation will appear more fully from a consideration of the following examples which are given for the purpose of illustration only and are not to be construed as limiting the invention in spirit or in scope. In these examples quantities are indicated as parts by weight, temperatures in degrees centigrade (° C.) and pressures in millimeters of mercury (mm.).

Example 1

To a mixture of 119 parts of N-(β-hydroxyethyl)-N-(β-hydroxypropyl)amine and 54 parts of 2-N-sodium carbonate in 450 parts of water are added 190.5 parts of 4-toluenesulfonyl chloride. This mixture is heated to about 95° C. for about 1 hour and then cooled to 0° C. and filtered. The filtercake is extracted with ether. After evaporation of the ether, the residue is crystallized from a mixture of 2-propanol and petroleum ether by chilling at —20° C. After recrystallization from a 1:3 by volume mixture of ethanol and acetone, N-(4-toluenesulfonyl)-N-(β-hydroxyethyl) - N - (β - hydroxypropyl)-amine melts at about 66.2–68.2° C. A mixture of 450 parts of this compound and 690 parts of thionyl chloride is heated gently at 125° C. for about 1 hour and then cooled. The excess thionyl chloride is evaporated and the residue purified by dissolving in dry toluene. This solution is filtered and then the solvent is evaporated to yield N-(4-toluenesulfonyl) - N - (β - chloroethyl)-N-β-chloropropyl)amine.

A mixture of 400 parts of this compound, 152 parts of sodamide, and 1040 parts of anhydrous toluene is heated to about 45° C. and then 110 parts of phenylacetonitrile are added portionwise. This mixture is refluxed for 2 hours, stirred for about 6 hours at room temperature and then decomposed with water. The organic layer is separated, washed with water, and evaporated. The residue is crystallized first from methanol, then washed successively with methanol, water, and methanol, and then boiled in methanol. The undissolved solid is collected on a filter and saved. The methanolic solution is then cooled to room temperature. The precipitated solid after recrystallization from methanol, melts at about 146.5–149° C. The undissolved material saved above, after recrystallization from butanol, melts at about 217.5–218.5° C. In this manner the two isomers of 1-(4-toluenesulfonyl)-3-methyl-4-phenyl-4-cyanopiperidine are obtained. The compound melting at about 146.5–149° C. is designated the α-isomer, while the compound melting at about 217.5–218.5° C. is called herein the β-isomer.

A mixture of 82 parts of 1-(4-toluenesulfonyl)-3β-methyl-4-phenyl-4-cyanopiperidine, 80 parts of potassium hydroxide and 800 parts of methanol is heated in an autoclave for 9 hours at about 190–200° C., cooled, boiled with activated charcoal, and filtered. The filtrate is evaporated and the residue is dissolved in water. The solution is rendered acid and the solid which precipitates is collected on a filter and purified by washing and boiling with water to yield 1-(4-toluenesulfonyl)-3β-methyl-4-phenyl-4-carboxypiperidine melting at about 209.5–211.4° C.

A mixture of 35 parts of the above compound and 50 parts of thionyl chloride is refluxed for 3 hours. The excess thionyl chloride is evaporated and the residue is purified by diluting the solution with anhydrous toluene and then evaporating the solvent. The residue is then refluxed for 8 hours with ethanol and the solid which precipitates is collected on a filter and then crystallized from methanol by chilling at 0° C. to yield 1-(4-toluenesulfonyl) - 3β - methyl - 4 - phenyl - 4 - ethoxycarbonylpiperidine melting at about 102–104.6° C.

By substituting 2-propanol for ethanol in the procedure outlined above, 1 - (4 - toluenesulfonyl) - 3β - methyl - 4-phenyl - 4 - isopropoxycarbonylpiperidine melting at about 118–119° C. is obtained.

A mixture of 79 parts of this compound, 54 parts of phenol, and 460 parts of a 30% solution of hydrogen bromide in acetic acid is stirred for 20 hours at about 28° C. The mixture is then partitioned between water and ether. The aqueous layer is separated, rendered alkaline, and extracted with ether. The ethereal solution is dried and evaporated. The residue is fractionated under vacuum to yield 3β - methyl - 4 - phenyl - 4 - isopropoxycarbonylpiperidine boiling at about 124–126° C. at 0.02 mm. pressure.

The foregoing process can also be applied to 1 - (4-toluenesulfonyl) - 3β - methyl - 4 - phenyl - 4 - ethoxycarbonylpiperidine to obtain 3β - methyl - 4 - phenyl - 4 - ethoxycarbonylpiperidine boiling at about 126° C. at 0.2 mm. pressure. The hydrochloride of this compound melts at about 175.6–176.2° C.

*Example 2*

A mixture of 5 parts of 3β - methyl - 4 - phenyl - 4 -ethoxycarbonylpiperidine, 4 parts of a 37% solution of formaldehyde, and 4 parts of a 90% solution of formic acid is heated for 45 minutes on a water bath and then refluxed for 5 hours. After cooling the mixture is dissolved in water, rendered alkaline, and extracted with ether. The ethereal solution is dried and evaporated. The residue is dissolved in ether. Hydrogen chloride gas is passed into this solution and the solid which precipitates is collected on a filter, boiled in anhydrous ether, and then recrystallized from benzene to yield 1,3β - dimethyl - 4 - phenyl - 4 - ethoxycarbonylpiperidine hydrochloride melting at about 181–182° C.

Substituting an equimolar amount of 3β - methyl - 4-phenyl - 4 - isopropoxycarbonylpiperidine in the procedure of the above paragraph, 1,3β - dimethyl - 4 - phenyl - 4-isopropoxycarbonylpiperidine hydrochloride melting at about 215.5–216.5° C. is obtained.

*Example 3*

A mixture of 8.1 parts of ethyl bromide, 7.1 parts of 3β - methyl - 4 - phenyl - 4 - ethoxycarbonylpiperidine hydrochloride, 10 parts of sodium carbonate, and 80 parts of butanone is heated for about 4 hours at 30° C. and then overnight at about 70° C. with stirring. The mixture is cooled, and filtered. The filtrate is evaporated and the residue is dissolved in diisopropyl ether. Hydrogen chloride gas is passed through the filtrate and the solid which precipitates is separated by decanting the solution. The solid is washed with diisopropyl ether to yield 1 - ethyl - 3β - methyl - 4 - phenyl - 4 - ethoxycarbonylpiperidine hydrochloride melting at about 178.3–179.6° C.

*Example 4*

A mixture of 9.2 parts of propyl bromide, 7.1 parts of 3β - methyl - 4 - phenyl - 4 - ethoxycarbonylpiperidine, 10 parts of sodium carbonate, and 80 parts of butanone is heated for 20 hours at about 75° C., cooled, and filtered. The filtrate is evaporated and the residue is dissolved in diisopropyl ether. Hydrogen chloride gas is passed through the filtrate. The solution is then allowed to stand about 30 minutes and the solid which precipitates is collected on a filter and dried to yield 1 - propyl - 3β - methyl-4 - phenyl - 4 - ethoxycarbonylpiperidine hydrochloride melting at about 178.–180.2° C.

*Example 5*

A mixture of 3.45 parts of n-butyl bromide, 7.1 parts of 3β - methyl - 4 - phenyl - 4 - ethoxycarbonylpiperidine, 10 parts of sodium carbonate, and 80 parts of ethanol is refluxed for 24 hours, cooled, and filtered. The filtrate is evaporated and the residue is dissolved in diisopropyl ether. Hydrogen chloride gas is passed through this solution and the solid which precipitates is collected on a filter and then recrystallized from a mixture of acetone and diisopropyl ether to yield 1 - butyl - 3β - methyl - 4-phenyl - 4 - ethoxycarbonylpiperidine hydrochloride melting at about 173.5–174.5° C.

*Example 6*

A mixture of 3.6 parts of n-heptyl bromide, 5 parts of 3β-methyl-4-phenyl - 4 - ethoxycarbonylpiperidine, 6.3 parts of sodium carbonate, and 80 parts of butanol is refluxed for 36 hours and filtered. The filtrate is evaporated and the residue is dissolved in diisopropyl ether. Hydrogen chloride gas is passed through the ethereal solution. Upon heating, the precipitated sticky solid solidifies and is then collected on a filter. After recrystallization from boiling acetone, 1-heptyl-3β-methyl-4-phenyl-4-ethoxycarbonylpiperidine hydrochloride melts at about 140–141° C.

*Example 7*

A mixture of 2.7 parts of β-(β-chloroethoxy)ethanol, 5 parts of 3β-methyl-4-phenyl - 4 - ethoxycarbonylpiperidine, 6.5 parts of sodium carbonate, and 80 parts of butanol is refluxed for 72 hours and filtered. The filtrate is evaporated to yield the crude 1-[β-(β-hydroxyethoxy)ethyl] - 3β - methyl - 4 - phenyl-4-ethoxycarbonylpiperidine. The oxalate of this compound is formed by the addition of oxalic acid in 2-propanol to the propanolic solution of the base. The solid which precipitates is collected and dried to yield 1-[β-(β-hydroxyethoxy)ethyl] - 3β - methyl-4-phenyl-4-ethoxycarbonylpiperidine oxalate melting at about 127.5–130.5° C.

What is claimed is:
1. A compound of the formula

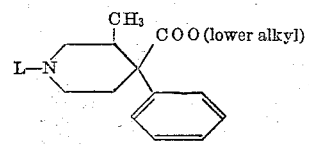

wherein L is a member of the class consisting of lower alkyl and HO—CH$_2$—CH$_2$—O—CH$_2$—CH$_2$—.

2. A compound of the structural formula

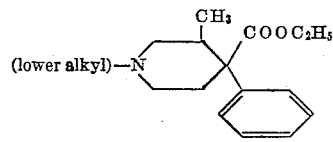

3. 1,3-dimethyl-4-phenyl-4-ethoxycarbonylpiperidine.
4. 1-ethyl-3-methyl-4-phenyl-4-ethoxycarbonylpiperidine.
5. 1-butyl-3-methyl-4-phenyl-4-ethoxycarbonylpiperidine.
6. 1-[β-(β-hydroxyethoxy)ethyl]-3-methyl-4-phenyl-4-ethoxycarbonylpiperidine.

References Cited in the file of this patent

UNITED STATES PATENTS

| | | |
|---|---|---|
| 2,813,874 | Bruce et al. | Nov. 19, 1957 |
| 2,824,875 | Elpern | Feb. 25, 1958 |
| 2,858,316 | Morren | Oct. 28, 1958 |
| 2,880,211 | Elpern | Mar. 31, 1959 |
| 2,901,487 | Elpern | Aug. 25, 1959 |

FOREIGN PATENTS

| | | |
|---|---|---|
| 629,196 | Great Britain | Sept. 14, 1949 |